United States Patent [19]
Beutner et al.

[11] 3,937,784
[45] Feb. 10, 1976

[54] METHOD FOR REMOVING FLUORIDE IONS FROM $UO_2$ POWDERS

[75] Inventors: Richard Beutner, Hanau; Friedrich Plöger, Kleinostheim, both of Germany

[73] Assignee: RBG, Reaktorbrennelemente GmbH, Wolfgang, near Hanau, Germany

[22] Filed: Nov. 23, 1973

[21] Appl. No.: 418,731

Related U.S. Application Data

[63] Continuation of Ser. No. 256,007, May 23, 1972, abandoned.

[30] Foreign Application Priority Data

June 1, 1971   Germany............................ 2127107

[52] U.S. Cl. .................. 423/19; 423/251; 423/260; 423/261
[51] Int. Cl........................ C01g 43/02; C01g 56/00

[58] Field of Search ............ 423/19, 260, 261, 251, 423/252

[56] References Cited
UNITED STATES PATENTS

| | | | |
|---|---|---|---|
| 3,168,369 | 2/1965 | Reese et al. .......................... | 423/261 |
| 3,179,491 | 4/1965 | Ukaji et al. .......................... | 423/261 |
| 3,235,327 | 2/1966 | Blundell et al....................... | 423/261 |
| 3,477,830 | 11/1969 | Hackstein et al. ................... | 423/261 |
| 3,519,403 | 7/1970 | Vietzke et al........................ | 423/261 |
| 3,547,598 | 12/1970 | Knudsen ............................. | 423/261 |

*Primary Examiner*—Benjamin R. Padgett
*Assistant Examiner*—E. A. Miller
*Attorney, Agent, or Firm*—Herbert L. Lerner

[57] ABSTRACT

A fluorine containing heavy-metal oxide powder, particularly $UO_2$ powder, is subjected to a pyrohydrolysis treatment under the most complete exclusion of hydrogen.

3 Claims, No Drawings

METHOD FOR REMOVING FLUORIDE IONS FROM UO₂ POWDERS

This is a continuation, of application Ser. No. 256,007, filed May 23, 1972, and now abandoned.

The corrosion problem is of extreme importance in the development, construction and operation of nuclear power plants. This applies not only to the coolant water circulation, but also to the nuclear fuel itself. The nuclear fuels normally used at present are based on uranium dioxide and as sintered bodies are filled into tubular jackets. These then form the so called "fuel rods", which in turn are combined to form fewer elements which can be manipulated jointly. For reasons of neutron physics, zirconium alloys are used almost exclusively as the material for the tubular jackets. These alloys, as well as its neighbors in Group IVa of the periodic system of elements, are sensitive to fluorine. The presence of fluorine in the jackets must be prevented absolutely and reliably in order to prevent damage to the tubular jackets by the known, most detrimental consequences of fluorine.

Uranium dioxide, however, is processed predominantly from uranium hexafluoride ($UF_6$). Thus, it is important in all manufacturing processes to remove fluorine as completely as possible from the uranium or uranium dioxide. Although a relatively high fluorine depletion is observed during the high sintering temperatures for $UO_2$ pellets, it is, nevertheless, necessary to strive for a further reduction of the fluoride ion content. In general 25 ppm (part per million) of fluorine are permitted as the maximum pellet contamination. Frequently, however, even lower values are required.

Even in manufacturing processes wherein uranium is precipitated from an aqueous solution, for instance, of the $UF_6$ hydrolysis solution, it is not possible to obtain sufficient separation. The precipitates of ammonium diuranate $(NH_4)_2U_2O_7$ and abbreviated (ADU) in most cases contain approximately 2%, and of ammonium uranyl carbonate $(NH_4)_4(UO_2(CO_3)_3)$ and abbreviated (AUC) contain approximately 0.05% of fluoride ion, which cannot be washed out. The problem therefore is to find an operationally easy-to-carry-out method for the removal of fluoride ions from heavy metal oxide products, particularly $UO_2$ powder, thereby increasing the economy and operational safety of nuclear power plants. These problems of course arise not only in the case of uranium, but also with plutonium and other nuclear fuels which are generally called herein heavy metals.

According to the invention, we solve this problem by subjecting the nuclear fuel powder to a pyrohydrolysis treatment with the most thorough exclusion of hydrogen. "Pyrohydrolysis" is understood to mean the decomposition of metal compounds under the influence of steam at high temperatures.

Many manufacturing methods for uranium dioxide already provide for steam treatment in order to reduce the fluorine content to tolerable residual values equal to or less than 100 parts per million. The length of this treatment, which occurs simultaneously with the reduction of uranium in hydrogen, depends greatly upon the temperature. Because, however, the greatest reaction speed of the reduction occurs at appreciably lower temperatures than the temperature for pyrohydrolysis, the latter determines the reaction speed. This applies not only to these methods in which both process steps are carried out within a single reaction vessel, but also to these methods in which separate reaction vessels are used for the reduction and the pyrohydrolysis steps.

We have surprisingly found that pyrohydrolysis proceeds faster, with lower partial hydrogen pressures in the steam atmosphere. This means that in the absence of hydrogen it becomes possible to reduce substantially the time for the pyrohydrolysis treatment or, with equal time, to reduce substantially the residual fluorine content in the $UO_2$ powder.

As was mentioned hereinabove, a reduction of the content of fluorine is necessary for reasons of quality and therefore in the last analysis serves to increase the life of the fuel rods of a nuclear reactor. In those cases, in which the corrosion problem might not be so important, this method results in considerable savings of time and is therefore economically advantageous.

The above statements are supported by the experimental results compiled in the following table. Described here is the pyrohydrolysis treatment of a $UO_2$ powder prepared by the AUC method and reduced at 500°C, which was treated on the basis of different treatment times with a hydrogen steam mixture or with steam alone at different temperatures. The powder originally contained here 460 ppm of fluorine, based on uranium.

| No. | Temperature °C | Duration of treatment in minutes | | | Results in ppm residual fluorine content |
|---|---|---|---|---|---|
| | | overall | with $H_2O/H_2$ mixture in a volumetric ratio of 9 : 1 | with $H_2O$ Steam alone | |
| 1 | 680 | 90 | | 90 | 60 |
| 2 | 680 | 90 | 90 | — | 55 |
| 3 | 680 | 90 | 90 | — | 70 |
| 4 | 680 | 90 | 90 | — | 67 |
| 5 | 680 | 60 | 30 | 30 | 50 |
| 6 | 680 | 60 | 30 | 30 | 65 |
| 7 | 680 | 60 | 30 | 30 | 95 |
| 8 | 680 | 60 | 30 | 30 | 50 |
| 9 | 680 | 60 | 15 | 45 | 20 |
| 10 | 680 | 60 | 15 | 45 | 30 |
| 11 | 680 | 60 | 15 | 45 | 20 |
| 12 | 680 | 45 | — | 45 | 20 |
| 13 | 680 | 45 | — | 45 | 20 |
| 14 | 680 | 45 | — | 45 | 25 |
| 15 | 650 | 45 | — | 45 | 80 |
| 16 | 650 | 45 | — | 45 | 50 |
| 17 | 650 | 45 | — | 45 | 55 |
| 18 | 650 | 45 | — | 45 | 70 |

The above data show clearly that the fluorine content are reduced substantially with decreasing times of hydrogen presence and that in this connection a treatment temperature of above 650°C is preferable. It is to be asumed that the residual fluorine content as is seen particularly from tests 12 to 14, can be reduced still further by extending the treatment duration. Suitable for carrying out the method is a vessel in which the ordinary reduction treatment of $UO_2$ powder with hydrogen takes place. However, it may require a certain time to reduce the hydrogen content to nearly zero for the subsequent pyrohydrolysis treatment. In view of the substantial reduction of the hydrogen content or to obtain practical freedom of hydrogen which is essential for the invention, it is recommended to provide a second reaction vessel for the pyrohydrolysis only, into which the reduced $UO_2$ powder is transferred.

We claim:

1. A method of purification of a heavy metal oxide selected from uranium and plutonium oxides for use as a nuclear fuel contaminated with fluoride and hydrogen to produce a purified heavy metal oxide containing not more than 25 parts per million fluoride which comprises passing steam in contact with said contaminated heavy metal oxide to effect removal of substantially all the hydrogen and thereafter subjecting said heavy metal oxide to pyrohydrolysis in the absence of hydrogen by passing steam at a temperature above 650°C in contact with said heavy metal oxide from which hydrogen has been removed to effect reduction of the fluorine content in said contaminated heavy metal oxide to no more than 25 parts per million.

2. Method according to claim 1 wherein reduction of the fluorine content is effected in a zone separate from the zone for effecting removal of substantially all the hydrogen.

3. Method according to claim 1 wherein the heavy metal oxide is uranium dioxide.

* * * * *